US011882055B1

(12) United States Patent
Khmelev et al.

(10) Patent No.: US 11,882,055 B1
(45) Date of Patent: Jan. 23, 2024

(54) COMPUTER RESOURCE-BASED API TRANSACTION METHOD AND SYSTEM

(71) Applicant: UIPCO, LLC, San Antonio, TX (US)

(72) Inventors: Yevgeniy Viatcheslavovich Khmelev, San Antonio, TX (US); Christopher Russell, The Colony, TX (US); Deborah Janette Schulz, San Antonio, TX (US); David Morley, San Antonio, TX (US); Gregory Brian Meyer, San Antonio, TX (US); Ryan Thomas Russell, The Colony, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/811,989

(22) Filed: Jul. 12, 2022

Related U.S. Application Data

(63) Continuation of application No. 17/219,026, filed on Mar. 31, 2021, now Pat. No. 11,477,134.

(60) Provisional application No. 63/002,940, filed on Mar. 31, 2020.

(51) Int. Cl.
*H04L 47/78* (2022.01)
*H04L 47/70* (2022.01)
*H04L 47/762* (2022.01)
*H04L 47/80* (2022.01)

(52) U.S. Cl.
CPC .......... *H04L 47/781* (2013.01); *H04L 47/762* (2013.01); *H04L 47/808* (2013.01); *H04L 47/826* (2013.01)

(58) Field of Classification Search
CPC .... H04L 47/761; H04L 47/808; H04L 47/826
See application file for complete search history.

(56) References Cited

U.S. PATENT DOCUMENTS

| 10,599,873 B2 * | 3/2020 | Winstrom ............ H04L 51/212 |
| 11,477,134 B1 * | 10/2022 | Khmelev .............. H04L 47/808 |
| 2012/0221955 A1 * | 8/2012 | Raleigh ................. H04M 15/00 726/1 |
| 2015/0007185 A1 * | 1/2015 | Dey ...................... G06F 9/5072 718/102 |
| 2015/0213449 A1 * | 7/2015 | Morrison ........... G06Q 20/4016 705/44 |
| 2016/0248641 A1 * | 8/2016 | Bhatia ................. H04L 41/0806 |
| 2017/0300363 A1 * | 10/2017 | Liu ........................ G06F 9/5083 |
| 2017/0300364 A1 * | 10/2017 | Liu ........................ G06F 9/5027 |

(Continued)

OTHER PUBLICATIONS

Non-Final Office Action dated Apr. 1, 2022 for U.S. Appl. No. 17/219,026.

(Continued)

*Primary Examiner* — Douglas B Blair
(74) *Attorney, Agent, or Firm* — Plumsea Law Group, LLC

(57) ABSTRACT

A transactional method and system of managing access to API services based on the performance of computational tasks by an end-user is disclosed. The system and method are configured to identify requests from an end-user to an API for services that are associated with a transactional cost. This cost is passed on to the end-user by generation of a computational task assignment to be completed by the client computing system. Once the assignment has been performed, the end-user may be granted access to the requested service.

20 Claims, 10 Drawing Sheets

(56) References Cited

U.S. PATENT DOCUMENTS

| | | | |
|---|---|---|---|
| 2018/0089465 A1* | 3/2018 | Winstrom | H04L 9/3247 |
| 2019/0349426 A1* | 11/2019 | Smith | H04L 67/1093 |
| 2020/0195421 A1* | 6/2020 | Gagnon | H04L 63/123 |

OTHER PUBLICATIONS

Notice of Allowance dated Jun. 14, 2022 for U.S. Appl. No. 17/219,026.

* cited by examiner

COMPUTER RESOURCE-BASED API TRANSACTION METHOD AND SYSTEM

CROSS-REFERENCE TO RELATED APPLICATIONS

This application is a continuation of Blair et al., U.S. patent application Ser. No. 17/219,026, filed Mar. 31, 2021, and entitled "Computer Resource-Based API Transaction Method and System," which claims priority to U.S. Provisional Patent Application Ser. No. 63/002,940 filed on Mar. 31, 2020 and titled "Computer Resource-Based API Transaction Method and System". The entire disclosures of the applications listed above are hereby incorporated by reference.

TECHNICAL FIELD

The present disclosure generally relates to the exchange of computer resource-related services, and specifically to a method and system for receiving access to a particular application or application feature in exchange for the performance of a processing transaction.

BACKGROUND

Various types of application programming interface (API) service providers may provide one or more online services and/or resources to users, merchants, and different entities. For example, the application services (also referred to herein as application features) may be associated with a social networking, mapping, video game, media playback, such as streaming services and/or downloading of digital media, or other types of applications. However, each online service requires processing power by the online service and data transfer capabilities between the online service and the user's computing device. In particular during times of high processing demand on the service provider, requests for processing by a client device to the service provider may expend a large amount of computing processing.

In view of these types of expenditures, many businesses and other organizations would benefit from mechanisms by which to reduce the transactional costs associated with the execution, operation, maintenance, and supporting of the services (for example, provided via various APIs) on the provider's own computers. For many business solutions, large numbers of end-users can often submit requests or 'calls' to applications that result in high-volume, or batch, transactions, rather than more infrequent interactive transactions. To combat these issues, API service providers may look for flexible and cost-effective ways to offer and maintain services for frequent consumer transactions.

There is a need in the art for a system and method that addresses the shortcomings discussed above.

SUMMARY

In one aspect, a method of managing requests to an application programming interface (API) is disclosed. The method includes identifying, for a transaction processing task, a plurality of task units, and receiving, at a first time, from a user account, a first request to access a first service offered through the API. The method further includes determining that access to the first service is conditional upon performance of a first amount of the transaction processing task, and assigning, to the user account, a first set of task units from the plurality of task units equivalent to the first amount. Furthermore, the method includes receiving a first indication that at least the first set of task units has been performed, and granting to the user account, in response to receiving the first indication, a first access session of the first service.

In another aspect, a system for managing requests to an application programming interface (API) includes a processor and machine-readable media. The machine-readable media include instructions which, when executed by the processor, cause the processor to identify, for a transaction processing task, a plurality of task units, and to receive, at a first time, from a user account, a first request to access a first service offered through the API. The instructions also cause the processor to determine that access to the first service is conditional upon performance of a first amount of the transaction processing task, and assign, to the user account, a first set of task units from the plurality of task units equivalent to the first amount. In addition, the instructions cause the processor to receive a first indication that at least the first set of task units has been performed, and grant to the user account, in response to receiving the first indication, a first access session of the first service.

In another aspect, a system for managing requests to an application programming interface (API) includes means for means for identifying, for a transaction processing task, a plurality of task units, as well as means for receiving, at a first time, from a user account, a first request to access a first service offered through the API. The system also includes means for determining that access to the first service is conditional upon performance of a first amount of the transaction processing task, and means for assigning, to the user account, a first set of task units from the plurality of task units equivalent to the first amount. Furthermore, the system includes means for receiving a first indication that at least the first set of task units has been performed, and means for granting to the user account, in response to receiving the first indication, a first access session of the first service.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
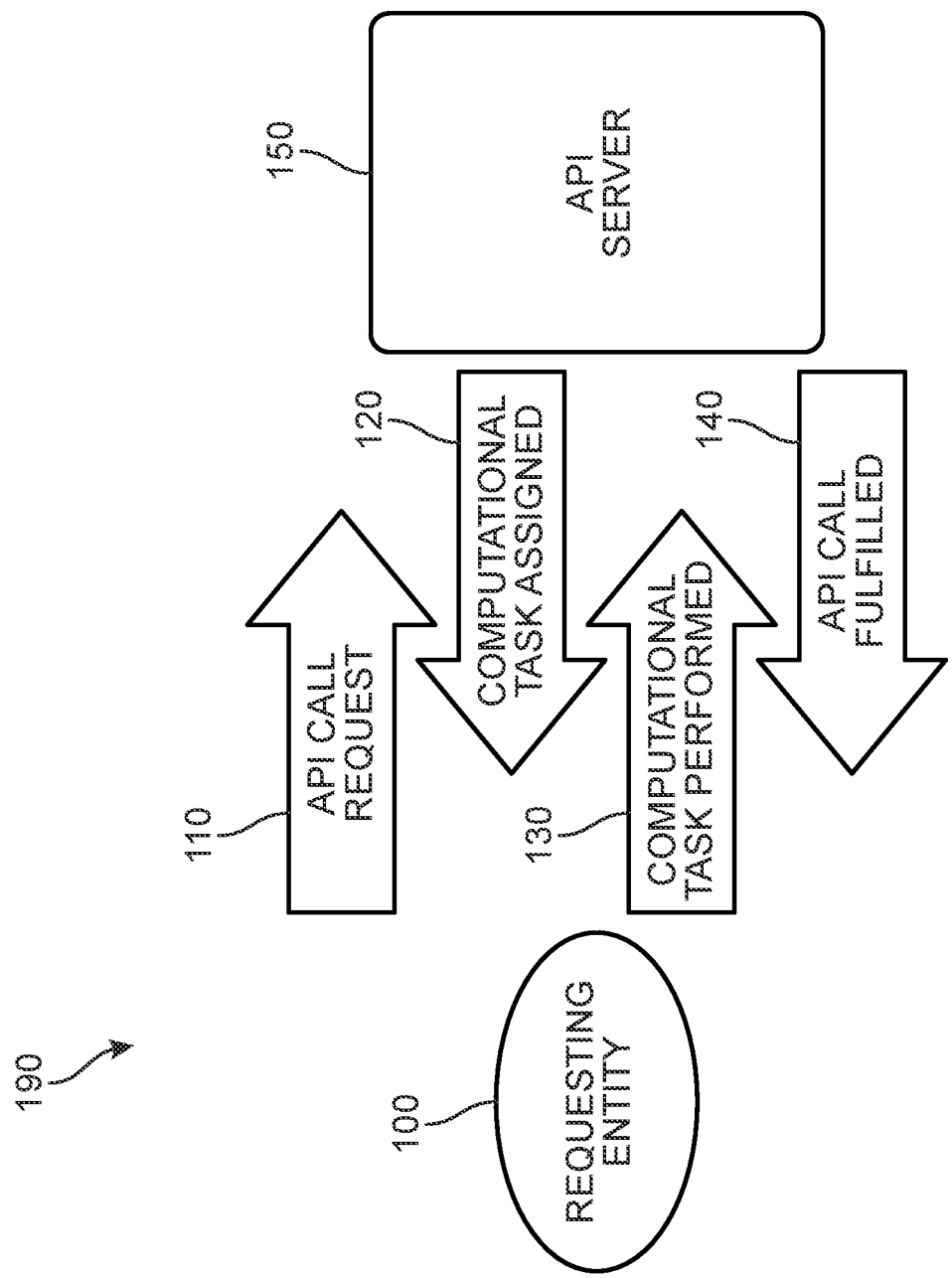
FIG. 1 is an overview of a scenario in which a first computer obtains access to an application feature by performance of a computing task, according to an embodiment.

The embodiments provide a method and system for reducing and in some cases eliminating unwanted and overburdensome application programming interface (API) call requests. Specifically, when outside parties are requesting an API service or feature via an API call to a service provider server, the systems and methods describe a mechanism by which such parties must—in exchange for access to the desired API service—perform by the use of their own computing resources one or more computing tasks. The proposed systems facilitate the completion of various processing tasks that are traditionally computer resource intensive by delegating, allocating, or otherwise distributing such tasks to computer resources belonging to outside parties, therefore managing the distribution of low priority computing tasks to such transactional counter-parties. In addition, such an arrangement reduces the likelihood of fraud and abuse by unscrupulous counter-parties, for example by effectively screening API requests to only those companies with sufficient computing resources to complete the predetermined compute tasks. As will be discussed below, the proposed systems can further be configured to offload or 'assign' a specific number and/or type of computing tasks to the computing devices of an end-user that must be performed in order for the API to fulfill a specific API call request.

For purposes of this application, an Application Programming Interface (API) can generally be understood to include a library of program elements such as functions, routines, protocols, or processes associated with a particular operating system or computing platform. The program elements may be software-based functions and/or processes in the form of source code, scripts, and/or executable code. The computing platform may include software and/or hardware. For example, the hardware may include a type of processor or hardware system. The software may include a version of an operating system such as Apple® iOS, MacOS®, Microsoft Windows®, Android® OS, UNIX, LINUX, or like environments that allow for running or executing an application and/or program. An API allow application programmers or providers to develop an application program capable of interfacing with the specified computing platform by incorporation of programs from the API library into the application program. A programmer may use a software development kit (SDK) or other tool to develop application programs. A development tool may include APIs or may enable the developer to remotely access APIs for a particular computer platform. Currently, most APIs are either openly accessible or include access control capabilities as part of the API.

With respect to the proposed systems and methods, it may be appreciated that the vast majority of internet services or sites now offer user experiences that combine two or more web-based services. These combined web-based services are referred to as "mashups." In some examples, a first web-based service may be configured to provide a web-based API to developers such that the first web-based service can be integrated with another, second web-based service. For example, an Internet website offering addresses and/or locations of retail stores may combine the Google Maps™ web-service with the store information in a particular area to present to users where the stores are available geographically. To integrate the Google Maps™ service, a user's web browser may support Javascript that then enables the user's browser to support the Google Maps™ API.

For purposes of clarity, an overview of one embodiment of the proposed systems and methods is illustrated with reference to FIG. 1. In FIG. 1, an example of an environment 190 in which an API may manage API calls in accordance with one embodiment of the proposed systems is shown. A client end-user or requesting entity 100 communicates to an API management service ("API gateway") associated with an API server 150 through an API call request ("API call") 110, represented in FIG. 1 by an arrow flowing from the requesting entity 100 and directed toward the API server 150. In response, the API gateway, which may act as a front end for the API call 110, identifies the 'value' or other 'exchange rate' for the service being requested and assigns to the requesting entity 100 a computational task comprising a plurality of task units, represented in FIG. 1 by a computational task assigned arrow 120 extending in a direction from the API server 150 to the requesting entity 100). If the assignment is performed (represented by a computational task performed arrow 130 flowing in a direction back toward the API server 150) and the API server 150 determines the task was completed successfully, the API can provide the requested service to the requesting entity 100, represented in FIG. 1 by an API call fulfilled arrow 140 extending in a direction toward the requesting entity 100. In other words, the end-user can be granted access to the requested service in exchange for the performance of the assigned task.

As a general matter, the API gateway or other API management module can be configured to distribute its 'assignment' of computational tasks to one or more computing nodes associated with a client or end-user. As used herein, the term "computational task unit" refers to a finite sized computational workload that must be processed using a CPU, GPU, or other processing unit. In some embodiments, computational tasks are generated by one or more application processes. Application processes may be running on one or more computing systems. In one embodiment, application processes could be located in a single computing system (such as a server or virtual machine). In other cases, application processes could be running on two or more different systems. In some cases, application processes could be processes running on distinct clients. Furthermore, an access window refers to a period of time or frequency in which an end-user is provided with and/or able to access an API service. During this access window, the end-user may engage with said service only once, or log in and use the service multiple times, where each occasion in which the user actively accesses the service corresponds to an access session. Thus, an access window may be limited to or refer to a single access session of a predefined duration, be configured to permit the user several access sessions over a longer duration (e.g., any number of access sessions for one week), or be configured to permit the user a specific number of access sessions (e.g., five access session granted for each task assignment performed).

Figure 2:
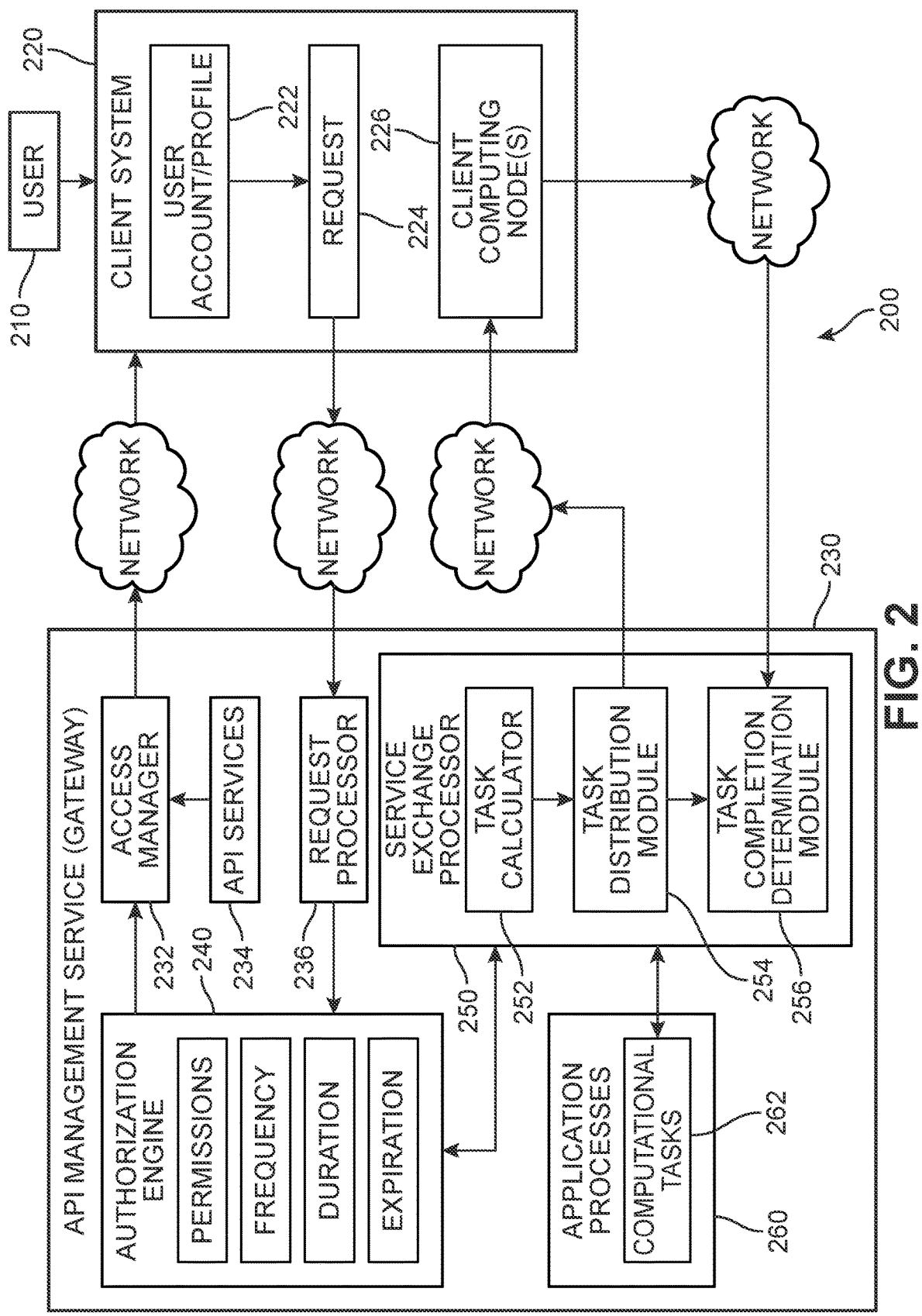
FIG. 2 is a schematic diagram of a computing task transaction system, according to an embodiment.

An illustrative example of an environment in which application programming interfaces may be managed is shown in FIG. 2, where a schematic diagram representing the architecture of one embodiment of an API service management system ("system") 200 is presented. As illustrated in FIG. 2, a client system 220 communicates electronically with a service provider system, referred to simply as a "provider", via a network connection. For example, when a user 210 accesses a client system 220, he or she may engage in a web-based activity that triggers the generation of a request 224 to an API gateway 230 via a network connection. The client system 220 may be, for example, a computing device separated from the provider by a network. The provider may comprise a collection of networked computing devices collectively configured to respond to and process API requests. The computing devices may include virtual machines and/or hardware machines. A client can request a description of available services from a service provider by requesting a document highlighting API descriptions. In some embodiments, the API description document may be different depending on which features of the API are exposed to the clients. Clients may use the API description document to format and communicate an API call with the service provider through an application programming interface.

In different embodiments, a request processor 236 associated with the API gateway 230 and supporting the API can be configured to receive the request 224. The request may be a variant of an API call. In different embodiments, the request processor 236 may include a group of computing resources that are configured to receive the request and, for example, convert the request into a request instance for further processing. In one embodiment, the request instance can be constructed based on the API call variant which includes metadata identifying an appropriate pre-processor to use for that variant. For example, a pre-processor can use the information contained in the request instance and/or the context of the API call variant to determine if the request instance should be processed.

In some embodiments, the request processor 236 may communicate with an authorization engine 240 to determine if the client system 220 has permission to use the API call variant. The request 224 can include additional information such as time of day, IP address, account type, origin of request, destination of request, hostname or other identifiers that may be extrinsically given or intrinsic to the request 224. In some embodiments, an API request can also contain a communication use protocol (e.g., SSL), a request token, a uniform resource locator, an authorization and authentication URL, an access token URL, a mobile application identifying information, and/or an application signature.

In some embodiments, the user 210 may be associated with a unique user account or profile 222 that can be accessed by the authorization engine 240 to determine whether the user 210 has been previously granted or linked to authorization to the selected service(s), previous access and/or usage history, how many access events or sessions (frequency) the user 210 has been granted to the particular service(s) and/or how many sessions remain, a duration of usage that may have been granted to the user 210, and/or whether the permissions have an expiration or other termination point that may have occurred. However, it should be understood that while the term "account" is used in this example in describing a specific user or entity with specific credentials, an account may also be used to more broadly refer to a source of the API request, such as the IP address from which the user generates the request. In addition, the user account can be one linked to a different API rather than the API from which the service is being requested, as would be expected in the multi-application 'mashup' scenarios noted above. In other words, a user with an account for one API may be permitted to rely on the same credentials when attempting to access a second, different API.

In some embodiments, the authorization engine 240 may be configured to permit the user 210 a free 'trial' access session to the requested service(s), or the user may have a paid subscription or other status that indicates to the authorization engine 240 that access to a requested API service(s) 234 should be provided to this user 210 (e.g., via an access manager 232) without requiring any additional 'payment' or other 'compensation' (i.e., performance of a computational task) in exchange for the service. In one embodiment, the authorization engine 240 can be configured to capture and displaying data on how the API is accessed, including who is accessing it, how they are accessing it, and where they are accessing it from, as well as limiting the number of times per second the API can be called from a given client system or IP address, and/or counting down to a maximum number of calls per day, week or month. Once the limit is reached, access can be turned off, or the user's/developer's account can be charged for access (e.g., via the service exchange process described herein), and/or a notification can take place.

For example, in some embodiments, the API gateway 230 can be configured to facilitate rate limiting for access to an API, such as specifying how many API calls per second that the API server will accept from a particular client system or where the API provider specifies how many calls the client system can make over a predetermined period of time (e.g., day, week, or month). If the client system exceeds the limit, the API gateway 230 may return a 403 error, issue a notification but continue to allow access, issue notification but allow access up to a certain high level of overage, and/or accept traffic up to a certain level for free, but charge for additional access that exceeds the free limit, where that charge may correspond to the performance of computational task assignments as described herein.

In cases where the authorization engine 240 determines the user 210 must 'pay' for the service by the performance of a computational task in order to be granted access to the service(s), a service exchange processor 250 can communicate with application processes 260. The application processes 260 can identify one or more computational tasks 262 that are in a task queue. These computational tasks 262 (also referred to as computational transactions) are sent to a task calculator 252. The task calculator 252 analyzes the computational tasks and determines the type and amount of one or more computational tasks that must be performed in order for the user 210 to be provided access to the requested service(s). The determination can vary based on user characteristics, user account status or membership, previous user activity, the type of access that is to be granted (e.g., recurring, extended duration, one-time only, etc.), and/or the computational resources available to or associated with the client system 220. Once the computational tasks 262 are received by the task calculator 252, the appropriately allocated amount of task units are sent to a task distributor or task distribution module 254, which can, via a network connection, transmit the 'assignment' to one or more client computing nodes 226 to process each of the tasks, as discussed further below. In addition, in some embodiments, computational tasks 262 may include one or more test tasks or test task units for which there is a known outcome or output value. These types of task units can facilitate the task performance verification processing. Test task units may also be referred to as verification tasks units, and test tasks can also be referred to as verification tasks throughout this application.

In some embodiments, the task distributor may function as a load balancer that acts to distribute computational workloads over a set of computing nodes to avoid overloading any particular node. In other embodiments, the task distributor may distribute tasks according to features such as "task similarity," which may be different from conventional load balancers. In one embodiment, the task distribution module 254 sends tasks to one of multiple different computing nodes associated with the client system 220. As used herein, the term "computing node" may refer to a unit for processing computational tasks or workloads. Each node could comprise at least one processor along with memory. In some embodiments, each of these computing nodes comprises a single server with a single processor. The processor may itself comprise multiple processing cores, as described below. However, in other embodiments, each computing node could comprise multiple servers (and/or processors). In other embodiments, each node could comprise a server cluster.

In different embodiments, one or more application processes 260 may generate computational tasks 262 to be performed by one or more computing nodes. Specifically, the application processes 260 may be configured to generate computational tasks that are as small as possible. As an example, where it is feasible, an application could generate two tasks that require three processing cores each, rather than a single task that requires six processing cores. As another example, an application could generate three tasks that each only require one processing core, rather than a single task that requires three processing cores. For example, generating tasks that are smaller (that is, tasks that require fewer processing cores to be completed) may allow for greater processor utilization per clock cycle.

As noted above, the task calculator 252 may receive computational tasks to be completed and identify specifically an amount and/or type of tasks that are equivalent, correspond, or otherwise match the current request. In some embodiments, the task calculator 252 can coordinate with task distribution module 254 to organize the tasks into groups, where each group comprises tasks that are computationally similar. As an example of computational similarity, two tasks may be more similar if they rely on similar information stored in RAM during processing. This may allow RAM to be shared between processors, or between cores within a processor, when two similar tasks are processed simultaneously (or near simultaneously). In some embodiments, once the tasks have been grouped according to computational similarity, the tasks may be distributed to the computational nodes 226. Specifically, each group of tasks may be sent to a single node so that tasks that are computationally similar may all be processed at the same computational node, thereby increasing the amount of RAM can be shared among processors or cores, as compared to the amount of RAM that could be shared by unrelated tasks. In some cases, different groups of tasks are sent to different nodes. In other cases, different groups could be sent to the same node, but at different times. It may be appreciated that in addition to considering computational similarity, a task distributor may also consider other factors in forming groups and/or in allocating and distributing tasks to computational nodes. For example, if a group of tasks is too large, sending all the similar tasks to a single node may not be feasible. Therefore, other factors could also be considered in deciding where to distribute different workloads. These include any suitable factors used by conventional load balancers in distributing workloads among multiple computing nodes.

The client computing node(s) 226 may receive and process computational tasks that have been delivered by the task distribution module 254. In different embodiments, client computing node(s) 226 includes one or more processors and memory. The memory may comprise a non-transitory computer readable medium. Instructions stored on the non-transitory computer readable medium may be executed by the one or more processors. The memory may include any type of short-term and/or long-term memory (or storage), including Random Access Memory (RAM), micro-SD memory and Solid State Drives (SSD). When a computing node is a single processor, the memory could comprise one or more memory caches. Furthermore, some processors may be multicore processors. Multicore processors comprise a single computing component that includes two or more distinct processing units, referred to as cores. Using a multicore processor, multiple different tasks can be run simultaneously (multiprocessing), a single task can be completed using multiple cores processing in parallel (parallel processing), and/or a combination of multiprocessing and parallel processing can be accomplished.

In different embodiments, a task completion determination module 256 can be configured to determine whether the client system 250 has successfully performed the assigned tasks. If the task completion determination module 256 determines that the assigned tasks have not been performed, were partially performed but unfinished, and/or were performed but one or more items are invalid or incorrect, the request 224 may be denied or blocked. If the request is not allowed, the request processor 236 may then respond the same as with any invalid request.

If the task completion determination module 256 determines the assigned tasks were completed successfully, the service exchange processor 250 can communicate with authorization engine 240 to create, update, or otherwise modify the permissions to be provided to user 210. This information is shared with the access manager 232, which can enable an access token, generate an access record, access token, or permission, or otherwise provide the requested API services 234 to the client system 220.

Figure 3:
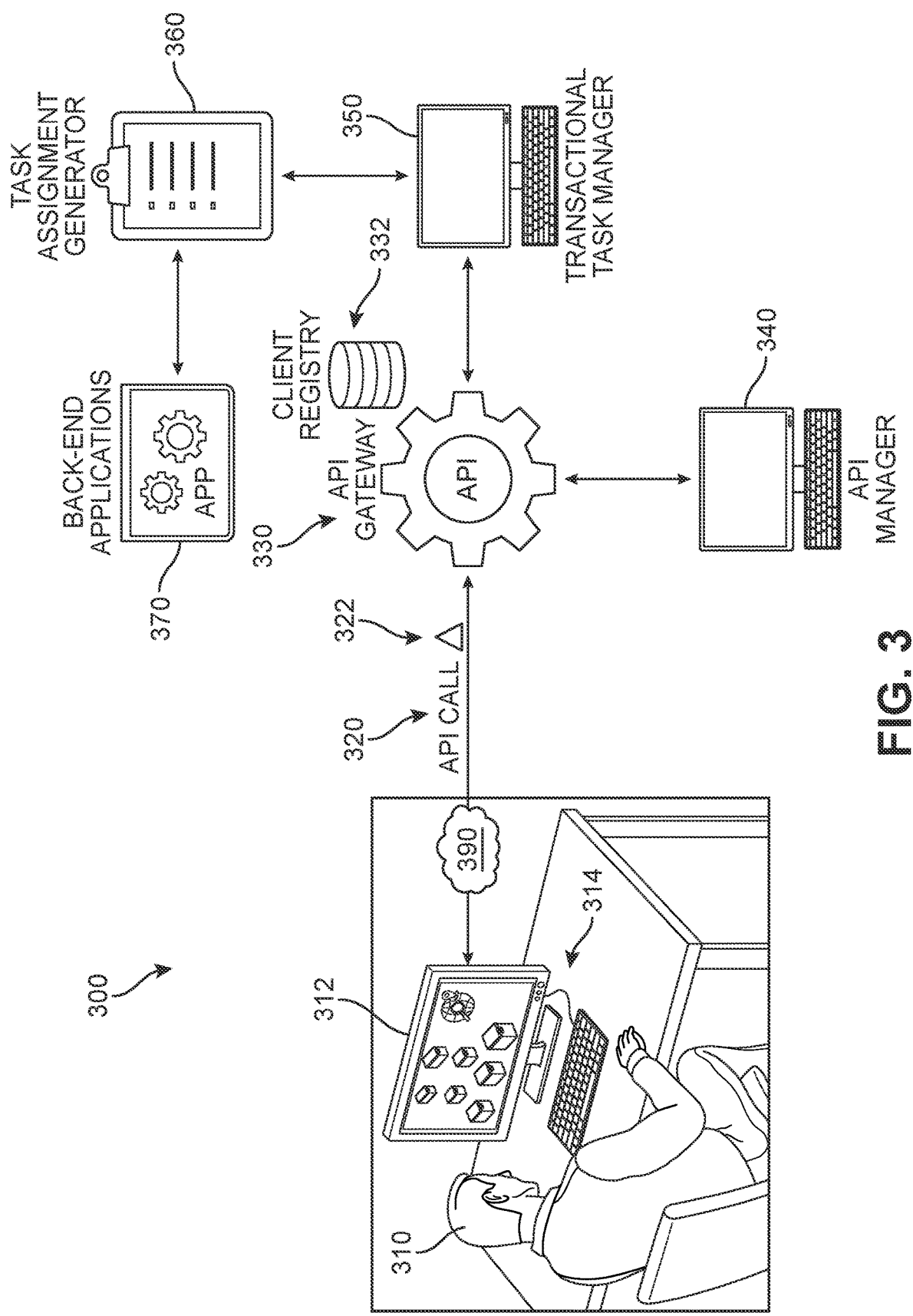
FIG. 3 is an example of an end-user attempting to access features of an API.

For purposes of clarity, one example of an API service access management system is presented with reference to FIGS. 3-9. In FIG. 3, an API management environment ("environment") 300 is depicted in which a computing device (client device 314) associated with an end-user 310 is shown attempting to call or access a feature or other service of an API via an internet browser 312. The client device 314 transmits an API call 320 to an API gateway 330 over a network 390. In some embodiments, the API gateway 330 can make reference to a client registry 332 to authenticate the end-user 310 and/or identify what permissions the end-user 310 has been allotted with respect to the specific API service 322 that is being requested (for purposes of simplicity represented here by a triangle icon). The API gateway 330 can verify whether the end-user 310 is authorized to make such requests. In addition, the API gateway 330 can determine whether fulfillment of the request for this particular user is contingent on the performance of a task assignment in some embodiments. If so, the API gateway 330 can be configured to receive specific task assignments via a transactional task manager 350. The transactional task manager 350 can communicate with back-end applications 370 or other application processes to determine the appropriate or designated amount and/or type of tasks that must be performed in order to obtain access to the requested service via an API manager 340.

Figure 4:
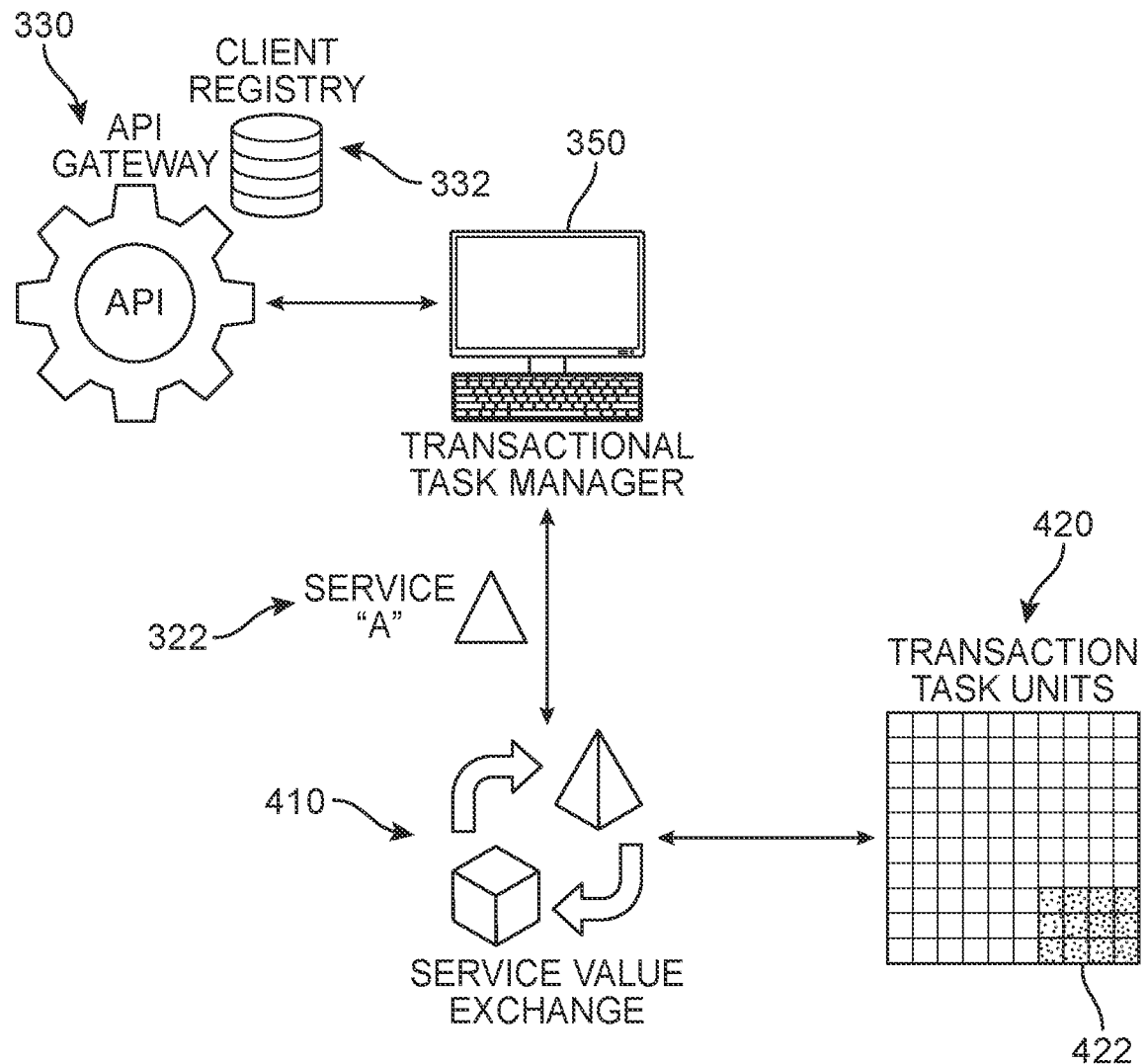
FIG. 4 is a schematic flow diagram showing an API gateway initiating a task exchange event, according to an embodiment.
Figure 5:
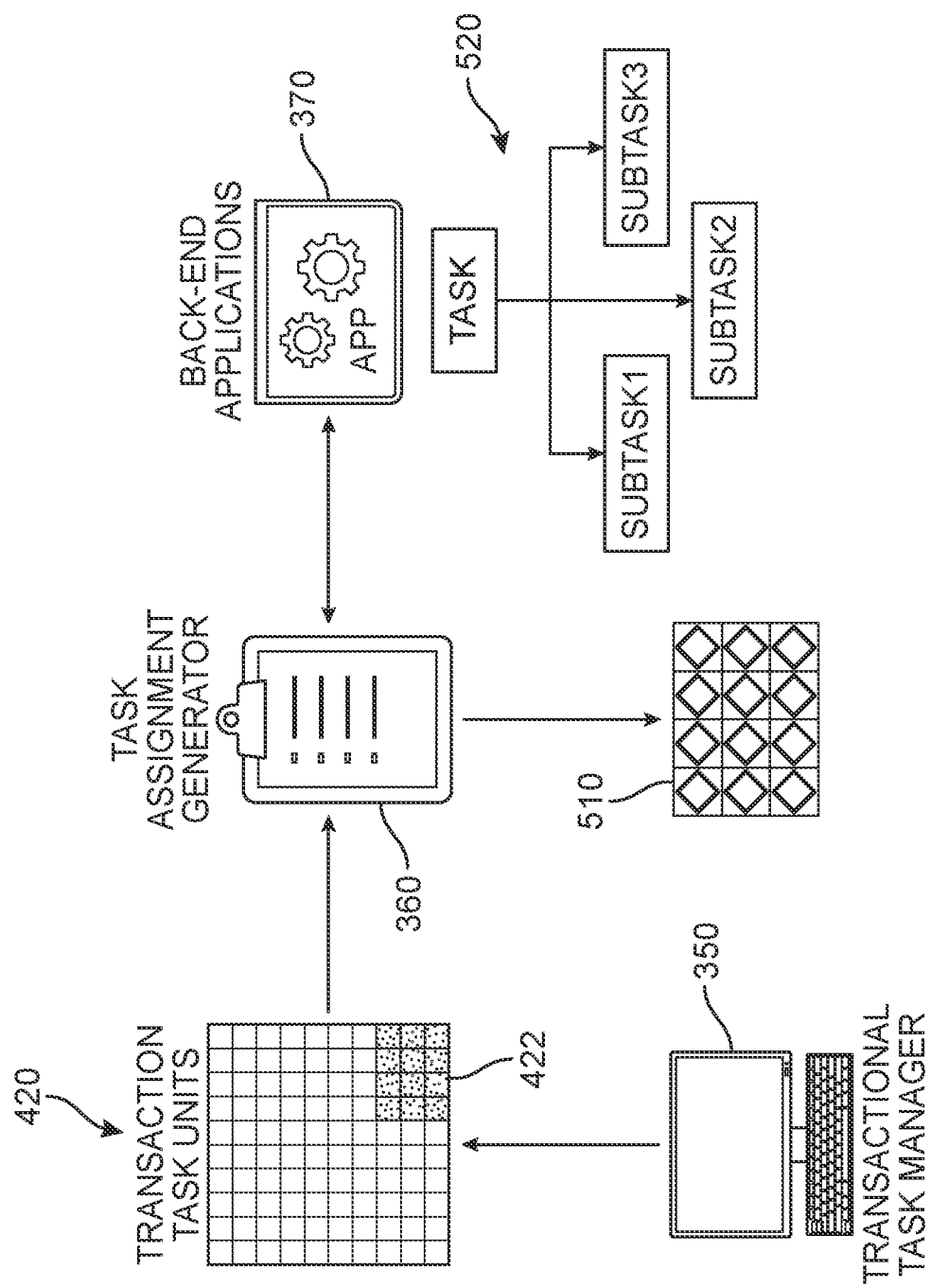
FIG. 5 is a schematic flow diagram illustrating a task assignment generation event, according to an embodiment.

Referring now to FIGS. 4 and 5, some elements of the environment 300 associated with task assignment generation are shown in greater detail. In FIG. 4, the transactional task manager 350 is depicted as it communicates with a service value exchange module 410. The transactional task manager 350 sends information that identifies the service 322 that has been requested (in this case, referred to as "Service A" and represented by the triangle icon) by the end-user. The service value exchange module 410 is configured to review one or more contextual factors, such as the account status of the end-user, the network over which the request was submitted, the type of service being requested, the current demand for said service, the number of occurrences of access being requested, the usage history of the end-user for this API, the time of day, and other factors, to determine the current exchange rate or value of the service 322 in transaction task units 420. For purposes of illustration only, the transaction task units 420 are represented as a grid of 100 squares, where a smaller (shaded) set of squares in the grid are shown to indicate the proportion or task amount 422 that corresponds to the value of the requested service. In this example, 12 squares have been shaded and are included in the set, where each square may be understood to correspond to a single transaction task unit of a specific type.

As shown in FIG. 5, this task amount 422 is then sent to the back-end applications 370, for example via task assignment generator 360. The back-end applications 370, as discussed earlier, can define discrete computational task units that describe a finite sized computational workload that must be processed using a CPU, GPU or other processing unit, shown here as a task parceling module 520. The task assignment generator 360 can access this queue of unperformed parceled units to allocate a set of specific computational task units that are equivalent to the task amount 422 and generate an assignment comprising this allocation. This is illustrated as a job assignment 510.

Figure 6:
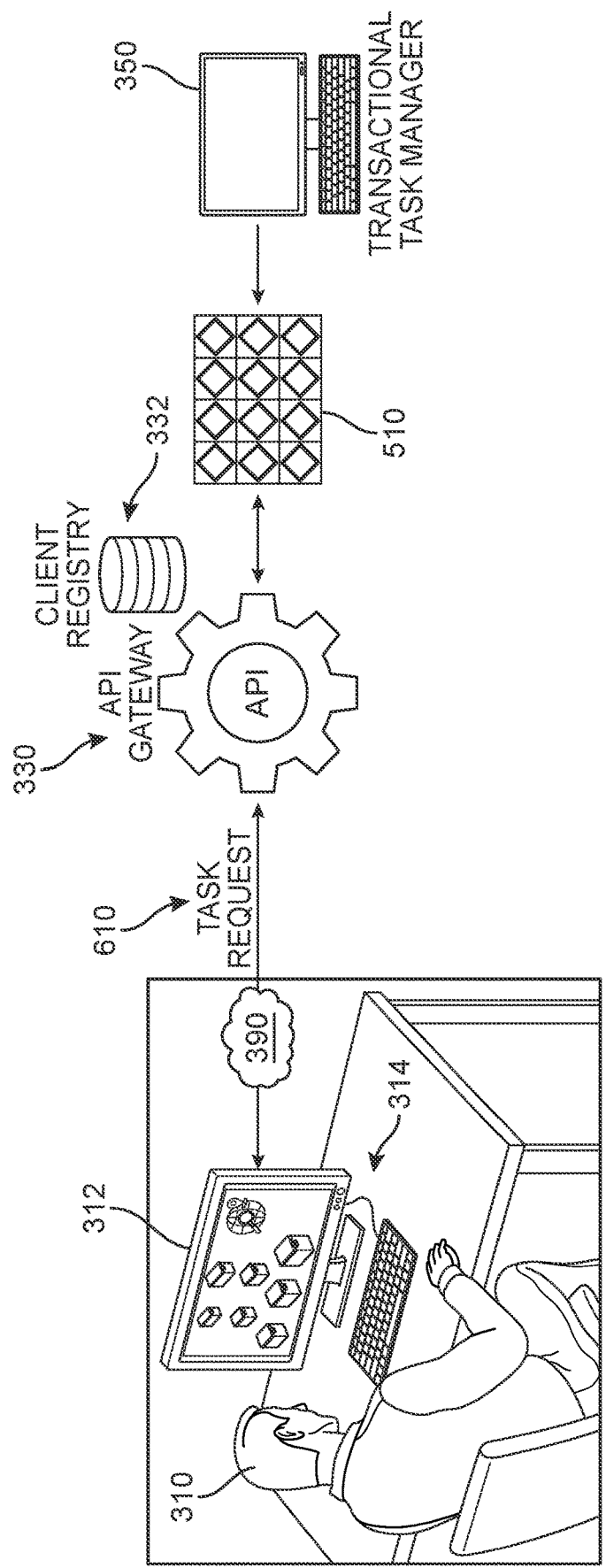
FIG. 6 is a schematic flow diagram depicting a task assignment being conveyed to the end-user introduced in FIG. 3, according to an embodiment.
Figure 7:
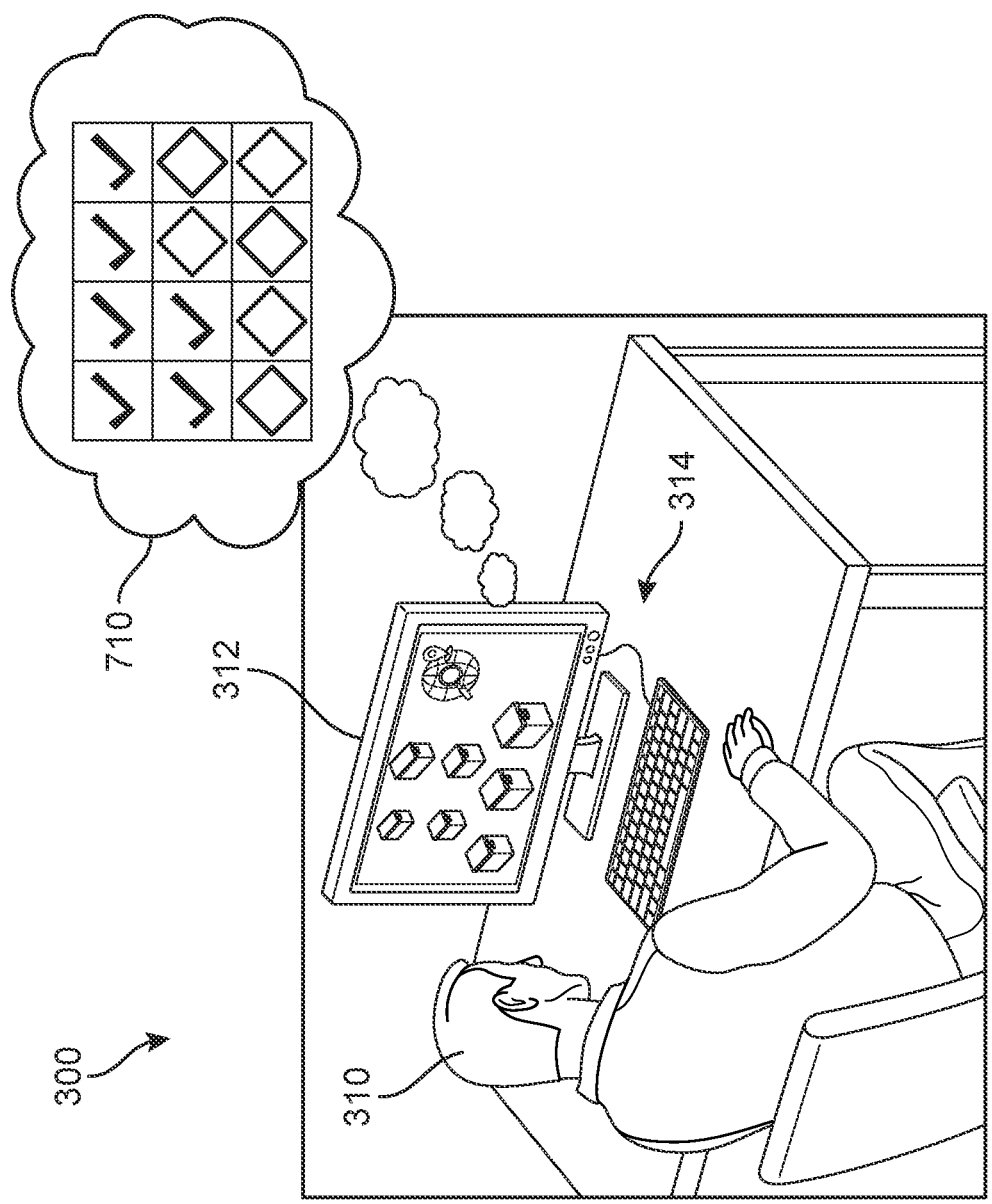
FIG. 7 is a schematic flow diagram illustrating the ongoing performance of the assigned task by the end-user, according to an embodiment.

In FIG. 6, job assignment 510, comprising a plurality of computational task units, is sent to the client device 314 of end-user 310 and received by the client device 314 as a task request 610. In some embodiments, the client device 314 and/or associated processing nodes can be notified of and/or accept the job assignment 510. In FIG. 7, the client device 314 is shown performing a sequence of work 710 corresponding to the task units comprising job assignment 510 over some period of time 720.

Figure 8:
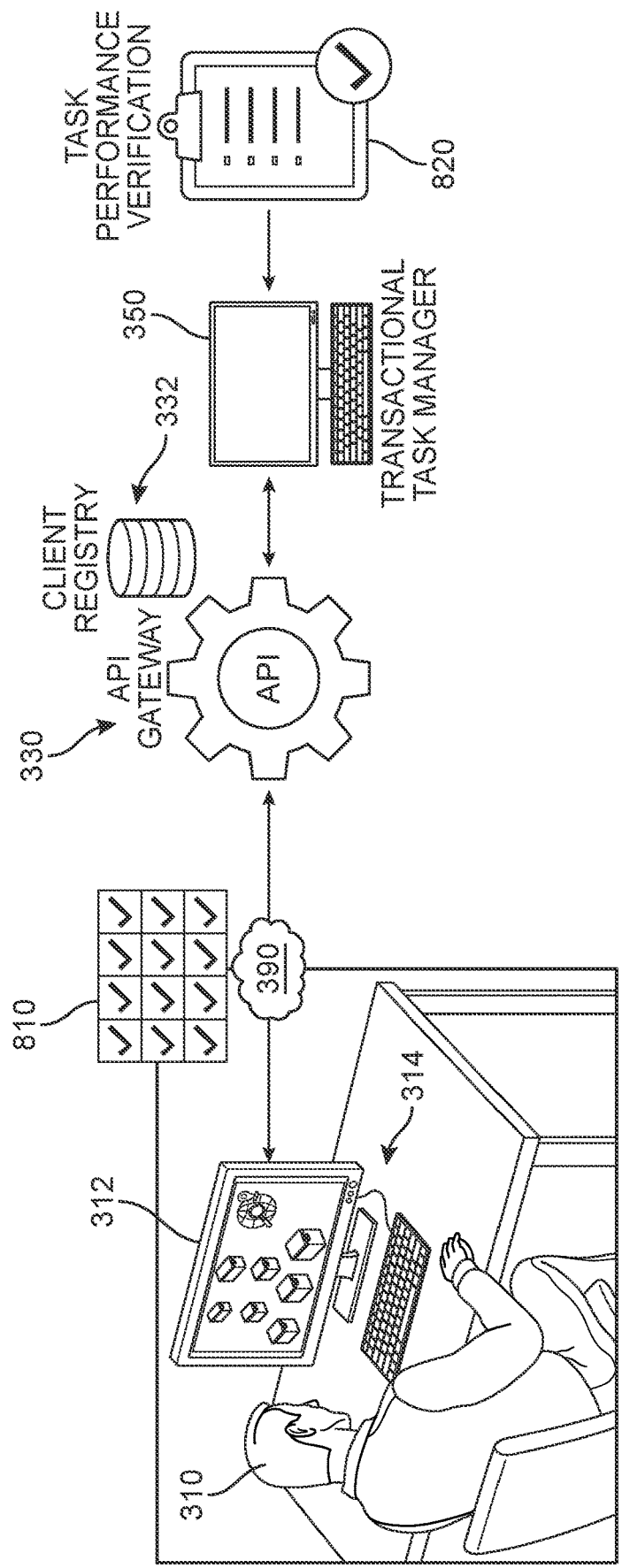
FIG. 8 is a schematic flow diagram showing the completion of the assigned task by the end-user and being provided to the API gateway, according to an embodiment.

Once the job assignment has been completed, the client device 314 can transmit a signal representing performed task units 810 or other data indicating the performance of the job assignment back to the API gateway 330 for review by the transactional task manager 350, as shown in FIG. 8. A task performance verification module 820 can determine whether the assigned task units were correctly performed and/or fully completed. In different embodiments, the task performance verification module 820 can make use of 'test' task units that were included in the job assignment during the verification process.

For purposes of this disclosure, a test task unit refers to a computational task unit that has a known outcome or output. In some cases, this may be because the test task unit is an artificially generated task that can be inserted into the set of task units being assigned to the end-user and serves as a 'dummy' verification task. The outcome of the dummy task is predefined, and so the performance output or completion signal sent by the end-user system should include this predefined value in order to pass the verification step. In some other cases, the test task unit can represent a task unit that is repetitive in nature, but nevertheless needs to be performed frequently by the application processors. The API benefits from distributing this load of work to other systems, and can readily verify whether the tasks were correctly performed and/or successfully completed. In different embodiments, the test task units can be arranged to occur in the job assignment task queue at specific intervals (e.g., every $5^{th}$ task unit), specific positions (e.g., $3^{rd}$ task unit, $7^{th}$ task unit), or specific proportions (e.g., 30% of the job assignment). The test task units can also be randomly distributed throughout the job assignment queue. In some embodiments, the job assignment may include not test task units, while in other embodiments, the entire job assignment may comprise test task units. For example, in cases where the goal of the service provider is to limit API calls to entities that have sufficient computing resources, the job assignment may only include test task units.

Figure 9:
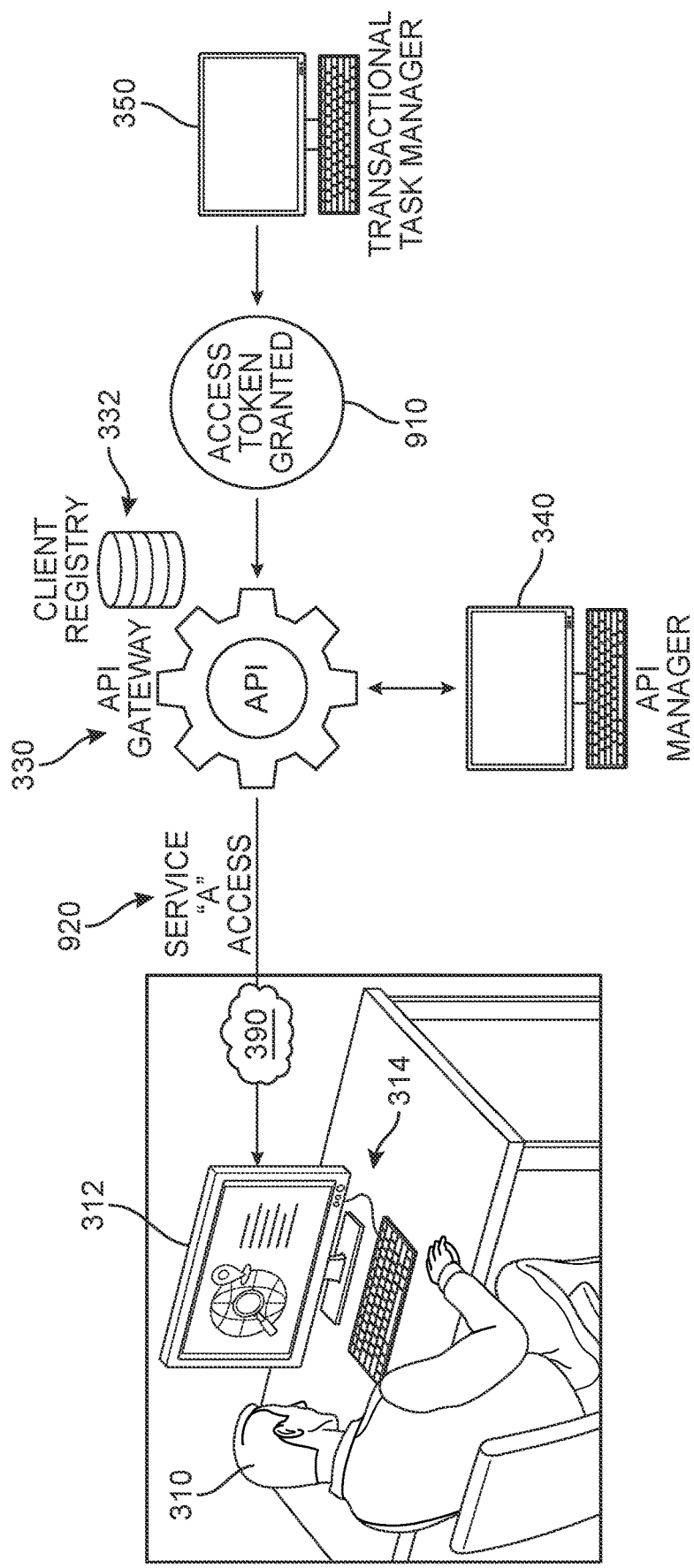
FIG. 9 is a schematic flow diagram depicting the API gateway granting access to the requested service to the end-user, according to an embodiment.

Once the performance has been verified and accepted, the transactional task manager 350 can generate or otherwise obtain access signal or permission token(s) 910 corresponding to a response to the API call, as shown in FIG. 9. The access signal 910 is detected by or provided to the API manager 340, which releases or otherwise enables access to the requested service for the end-user 310. It should be noted that—as discussed earlier with respect to FIG. 2—the transaction event in which the end-user receives and performs a job assignment can occur at the time of the request, or at any time prior to the request. In other words, the end-user may agree to perform one or more assignments corresponding to the value of one or more usage or access sessions of the API service, and store or record this performed 'currency' for future usage sessions. In some embodiments, an entity may share their account 'funds' with other users who will not have to perform the computational tasks in order to obtain access to the service but instead can rely on the stored value of previously performed tasks (similar to a pre-paid use plan).

Figure 10:
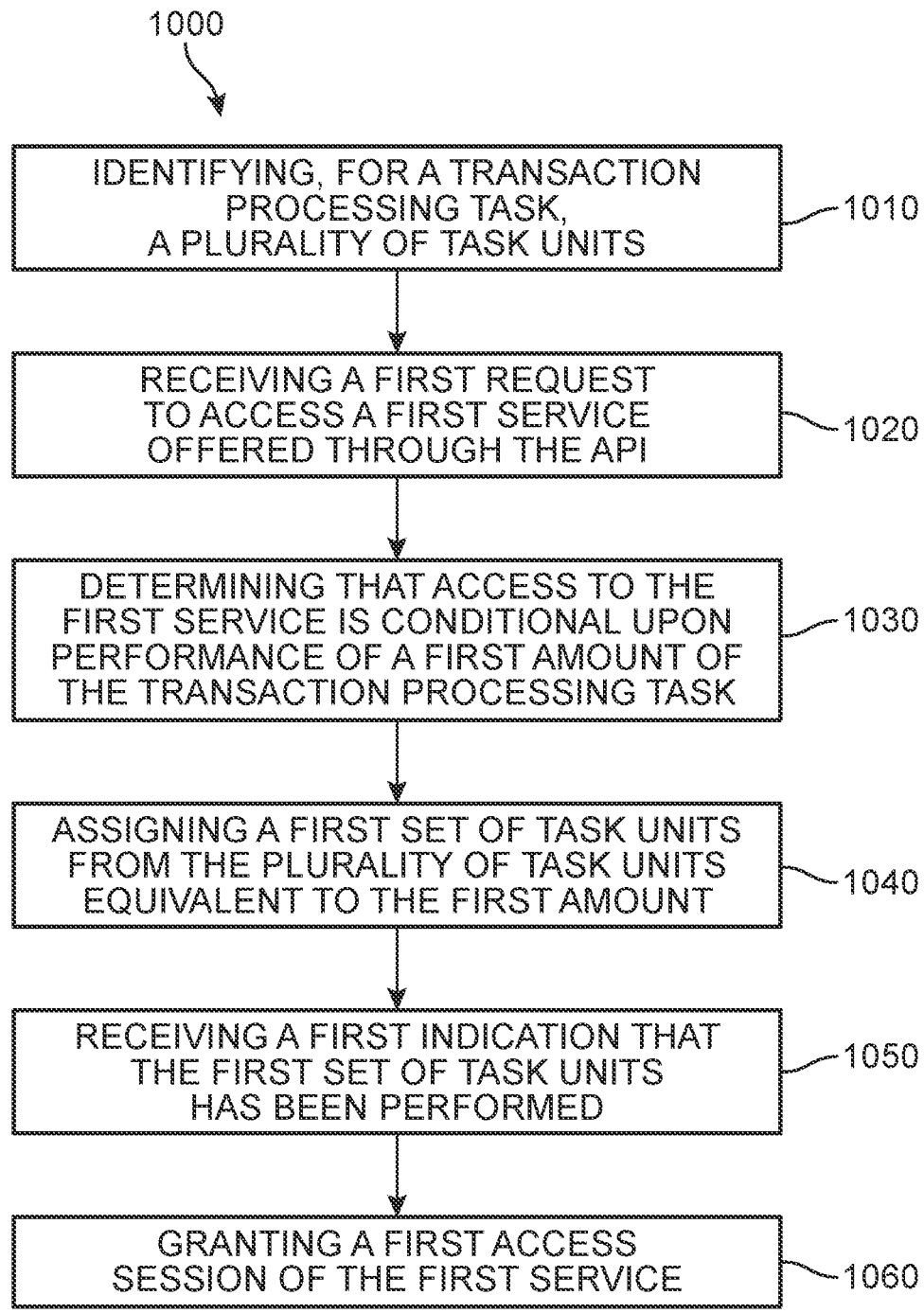
FIG. 10 is a flow chart depicting a process of exchanging computer transactional tasks in exchange for services provided by an API, according to an embodiment.

FIG. 10 is a flow chart illustrating an embodiment of a method 1000 of managing requests to an application programming interface (API). The method 1000 includes a first step 1010 of identifying, for a transaction processing task, a plurality of task units, as well as a second step 1020 of receiving, at a first time, from a user account, a first request to access a first service offered through the API. The method 1000 also includes a third step 1030 of determining that access to the first service is conditional upon performance of a first amount of the transaction processing task, and a fourth step 1040 of assigning, to the user account, a first set of task units from the plurality of task units equivalent to the first amount. A fifth step 1050 includes receiving a first indication that at least the first set of task units has been performed, and a sixth step 1060 includes granting to the user account, in response to receiving the first indication, a first access session of the first service.

In other embodiments, the method may include additional steps or aspects. In one embodiment, an access signal, access record, access token, or permission token granting a predetermined number of subsequent access sessions of the first service to the user account is generated in response to receiving the first indication. In some embodiments, the method can further include steps of receiving from the user account, at a second time after the first time, a second request to access the first service, determining that the user account is associated with the access record, and granting, in response to determining the user account is associated with the access record, a second access session of the first service. In another example, the method can also include steps of receiving, from the user account, a first number of requests to access the first service, determining the first number of requests exceeds the predetermined number, and assigning, to the user account, a second set of task units from the plurality of task units equivalent to the first amount.

In different embodiments, the method can also include steps of receiving, from the user account, a second request to access a second service offered through the API, determining that access to the second service is conditional upon performance of at least a second amount of the transaction processing task that differs from the first amount, assigning, to the user account, a second set of task units from the plurality of task units equivalent to the second amount, receiving a second indication that the second set of task units has been performed, and granting to the user account, in response to receiving the second indication, a second access session of the second service. In other words, the system can be configured to value one service higher than another service, and manifest this difference in the number of task units included in a task assignment. In some embodiments, the API receives an average of a first number of requests for the first service over a first period of time and a second number of requests for the second service over the first period of time, and the difference between the first amount and the second amount is proportional to a difference between the first number and second number. In other words, the average demand for a service over a period of time can be a factor in how much that service should be valued. In addition, a service can have a dynamic value that ebbs and flows with the increase and decrease of user demand for said service, which can in turn affect the amount of task units that will be assigned in order to 'pay' for access to the service.

In another example, the method may also include steps of assigning, to the user account, in addition to the first set of task units, one or more verification tasks, receiving, from the user account, a signal corresponding to a response to the assignment of the first set of task units and one or more verification tasks, verifying the one or more verification tasks were performed correctly, and generating the first indication in response to verifying the one or more verification tasks were performed correctly. In some cases, the method can further include receiving, at a second time before the first time, an initial request from the user account for trial access of the first service, determining that trial access to the first service is available to the user account, and then granting to the user account a trial access session of the first service prior to the granting of the first access session.

In different embodiments, the method may involve determining that granting the user account access to the first service is associated with a first transactional cost and granting the user account access to the second service is associated with a second transactional cost that is lower than the first transactional cost. In such cases, a calculation of the first amount can be based at least on the first transactional cost, a calculation of the second amount is based at least on the second transactional cost, where the first amount is greater than the second amount. In some other examples, the method may also include providing, to the user account, a program configured to execute the performance of the first set of task units.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for managing access to an application programming interface (API), the system comprising a processor and machine-readable media including instructions which, when executed by the processor, cause the processor to:
   receive requests from a user account to access a service offered through the API;
   assign computational tasks to the user account that must be performed using computational resources that are associated with the user account before the user account is allowed access to the service;
   transmit the assigned computational tasks to multiple nodes associated with the computational resources for the user account;
   determine whether the assigned computational tasks have been successfully performed; and
   provide access to a requested service when the task completion determination module has determined the assigned computational tasks have been successfully performed.

2. The system of claim 1, wherein the instructions further cause the processor to identify one or more computational tasks that are in a task queue.

3. The system of claim 2, wherein the identified computational tasks are used to determine a type and amount of one or more computational tasks that must be performed in order for the user account to be provided access to a requested service.

4. The system of claim 3, wherein the determination of type and amount is based on one or more of user account status, user activity, and the computational resources available via the user account.

5. The system of claim 1, wherein the instructions further cause the processor to organize the computational tasks into groups that are computationally similar.

6. The system of claim 5, wherein each group is sent to a single node so that tasks that are computationally similar are all be processed at the same computational node.

7. The system of claim 1, wherein the requests from the user account further include one or more of a communication use protocol, a request token, a uniform resource locator, an access token URL, and an application signature.

8. The system of claim 1, wherein a portion of the assigned computational tasks comprise a plurality of verification tasks for which there is a known output value.

9. The system of claim 1, wherein the instructions further cause the processor to deny access to the user account if the the assigned computational tasks have not been performed, were partially performed but unfinished, or were performed but one or more items are invalid.

10. A method of managing requests to an application programming interface (API), the method comprising:
    receiving, at a request processor associated with the API, a first request from a user account to access a service offered through the API;
    determining, at a service exchange processor associated with the API, that access to the first service is conditional upon performance of a first set of computational tasks using computational resources associated with the user account;
    transmitting, via a task distribution module, the first set of computational tasks to multiple nodes associated with the computational resources for the user account;
    determining, at the service exchange processor, that the first set of computational tasks have been performed successfully by the computational resources associated with the user account; and
    providing at a first time, via an authorization engine associated with the API, permissions to the user account and enabling access to the API in response to determining the first set of computational tasks have been performed.

11. The method of claim 10, further comprising granting at least one subsequent access session of the service to the user account in response to determining the first set of computational tasks have been performed.

12. The method of claim 11, further comprising:
    receiving from the user account, at a second time after the first time, a second request to access the service;
    determining the user account has at least one subsequent access session remaining; and
    granting, in response to determining at least one subsequent access session remains, a second access session of the service to the user account.

13. The method of claim 12, further comprising:
    receiving from the user account, at a third time after the second time, a third request to access the service;
    determining the user account has at no access sessions remaining; and
    denying, in response to determining no access session remains, subsequent access sessions of the service by the user account.

14. The method of claim 13, further comprising assigning to the user account, in response to determining no access session remains, a second set of computational tasks.

15. The method of claim 10, wherein the first set of computational tasks further include an artificially generated verification task which has a predefined outcome.

16. The method of claim 15, further comprising:
receiving, at the service exchange processor, an output from the user account indicating performance of the first set of computational tasks;
determining the output includes the predefined outcome; and
verifying, in response determining the output includes the predefined outcome, the first set of computational tasks were performed successfully.

17. A system of managing requests to an application programming interface (API), the system comprising one or more computers and one or more storage devices storing instructions that are operable, when executed by the one or more computers, to cause the one or more computers to:
receive, at a request processor associated with the API, a first request from a user account to access a service offered through the API;
determine, at a service exchange processor associated with the API, that access to the first service is conditional upon performance of a first set of computational tasks using computational resources associated with the user account;
transmit, via a task distribution module, the first set of computational tasks to multiple nodes associated with the computational resources for the user account;
determine, at the service exchange processor, that the first set of computational tasks have been performed successfully by the computational resources associated with the user account; and
provide at a first time, via an authorization engine associated with the API, permissions to the user account and enabling access to the API in response to determining the first set of computational tasks have been performed.

18. The system of claim 17, wherein the first set of computational tasks further include an artificially generated verification task which has a predefined outcome.

19. The system of claim 18, wherein the instructions further cause the one or more computers to:
receive, at the service exchange processor, an output from the user account indicating performance of the first set of computational tasks;
determine the output includes the predefined outcome; and
verify, in response determining the output includes the predefined outcome, the first set of computational tasks were performed successfully.

20. The system of claim 17, wherein the instructions further cause the one or more computers to grant at least one subsequent access session of the service to the user account in response to determining the first set of computational tasks have been performed.

* * * * *